US006571295B1

(12) United States Patent
Sidana

(10) Patent No.: US 6,571,295 B1
(45) Date of Patent: May 27, 2003

(54) WEB PAGE ANNOTATING AND PROCESSING

(75) Inventor: Ashmeet S. Sidana, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/357,529

(22) Filed: Jul. 19, 1999

Related U.S. Application Data

(63) Continuation of application No. 08/594,873, filed on Jan. 31, 1996, now Pat. No. 6,081,829.

(51) Int. Cl.[7] .............................................. G06F 15/16
(52) U.S. Cl. ........................ 709/246; 709/203; 709/217; 707/512; 707/513
(58) Field of Search ................................ 709/203, 246, 709/201, 204, 205, 217, 219; 707/512, 513, 515

(56) References Cited

U.S. PATENT DOCUMENTS 5,826,025 A * 10/1998 Gramlich ........................ 707/4
6,081,829 A * 6/2000 Sidana ......................... 707/512

OTHER PUBLICATIONS

Jean Paoli, Cooperative Work On the Network: Edit the WWW! (Apr. 10–14, 1995), The Third International World-Wide Web Conference, http://www.igd.fhg.de/archive/1995_www95/papers/76/paper.html.*

Maly et al, Mosaic+XTV=CoReview (Apr. 10–14, 1995), The Third International World-Wide Web Conference, http://www.igd.fhg.de/archive/1995_www95/papers/70/MAIN–DOCUMENT.html.*

Peters et al, CrystalWeb—A Distributed Authoring Environment for the World Wide Web, (Apr. 10–14, 1995), The Third International World-Wide Web Conference, http://www.igd.fhg.de/archive/1995_www95/papers/49/crystalweb/crystalweb.html.*

* cited by examiner

Primary Examiner—Mehmet B. Geckil
(74) Attorney, Agent, or Firm—Lee & Hayes, PLLC

(57) ABSTRACT

A general purpose system and method for associating annotations, modifications, or other information with a web-viewable document is disclosed. An embodiment of the system and method includes the use of a "redirector." A user attempting to access a document at a particular web address, sends a request to view the document to that address. The request is intercepted by the redirector which, in turn, requests the document on behalf of the user. The redirector modifies the document and returns the modified document for viewing by the user. The modifications may include, for example, various comments or annotations to the original web-viewable document. According to the invention, such customized documents may be presented to the user without modification of commercially available browser and/or server software.

37 Claims, 11 Drawing Sheets

Annotation Information

Display Options

WEB PAGE ANNOTATING AND PROCESSING

CROSS-REFERENCE TO RELATED APPLICATION

This application is a continuation of, and incorporates by reference, parent patent application entitled "General purpose web annotations without modifying browser" having Ser. No. 08/594,873 and inventor Ashmeet S. Sidana, which was filed on Jan. 31, 1996 and issued on Jun. 27, 2000 as U.S. Pat. No. 6,081,829.

BACKGROUND OF THE INVENTION

This application relates to the exchange of information via the World Wide Web and, particularly, to a method and apparatus for allowing one or more persons to store custom information for a Web document that is being viewed.

With the proliferation of the internet and the popularity of the World Wide Web, large amounts of information are accessible to anyone connected to the internet who has Web browser software. A well-defined protocol called "HyperText Transfer Protocol" (HTTP) allows a browser to access Web documents. HTTP is described in the Web document stored at http://www.w3.org/pub/www/Protocols HTTP/ 1.0—Hypertext Transfer Protocol, T. Berners Lee, R. Fielding, H. Nielson, Aug. 3, 1995, which is incorporated by reference herein. The layout language for a Web document is called "HyperText Markup Language" (HTML). HTML is described in the internet document RFC1866 by T. Berners Lee MIT/W3C November 1995, ftp://ds.internic.net/rfc/rfc 1866.txt, which is also incorporated by reference herein.

Web documents are stored in HTML form in association with "server" software on a remote computer. An address of a specific Web document is called a "Uniform Resource Locator" (URL). A user employs "browser" software on a local client computer to request a document stored at a particular URL. When the server receives the user's request, it sends the HTML for the requested document to the browser, which displays the document in accordance with the HTML.

There are many popular servers and browsers. Currently, however, there is no mechanism for the user of a browser to store custom information (such as the user's own comments) in association with the documents that the user is viewing.

For example, a user may wish to annotate a Web-viewable document and, at a later date, view the document again in association with the prior annotations. It might be possible to modify the HTTP protocol, the browser and/or server software, so as to provide a mechanism whereby a user could store his or her comments in association with a Web-viewable document. However, because browsers and servers are commercial products, users cannot easily modify browser and/or server software to add this functionality. Moreover, users do not generally have access to the server software, which typically exists on a remote computer. Therefore, there is a need for a process and associated system which would enable a user browsing the Web to store information associated with a Web document, without the necessity of modifying HTTP protocols, the browser software and/or the server software.

SUMMARY OF THE INVENTION

The present invention overcomes the problems and disadvantages of the prior art by using a software program called a "redirector" to allow a user to store custom information in conjunction with Web documents. In a preferred embodiment, the custom information includes annotations made by a user to a Web document. In this embodiment, browser software sends an HTTP request to the redirector, which sends back an HTML "form" to the browser. The browser displays the form as it would any HTML form. The form allows the user to specify the Web document that he wishes to view and to specify various options relating to whether annotations or the like should be displayed when the document is viewed. The browser then sends ("submits") the information from the form to the redirector. This information includes the URL of the Web document to be viewed and whether annotations should be displayed.

The redirector next retrieves the HTML for the specified Web document from an appropriate document server, replaces any URLs in the HTML with its own URL, and saves the replaced URLs. If the user previously had made any annotations or had added any other custom information to the Web document, the annotations and/or other custom information were stored in the redirector at that time. The redirector modifies the HTML of the requested document to include any previously added annotations, if the user wants such annotations displayed. The redirector also modifies the HTML so that various input forms for allowing user input (such as "buttons", text boxes, etc.) will be displayed by the browser. The HTML for the document, the HTML for the input forms, and the HTML for the annotations are collectively termed "augmented HTML." The augmented HTML is then sent to the browser, which displays the document along with the input forms and (possibly) any annotations previously added by the user.

Once a document is displayed by the browser, the user can add, delete, or modify the annotations or other information associated with the document and displayed by the browser. If the user clicks on a URL in the document, the browser will access the redirector instead of the server originally specified by the URL since, as previously explained, all URLs in the document were modified by the redirector to point to the redirector. The redirector fetches the referenced Web document that corresponds to the position clicked by the user, and creates augmented HTML for a new document, which is sent to the browser for display.

The annotations and any other custom information are retained by the redirector, but are not a part of the HTML for the document stored on the document server. The original document is not modified. Thus, the present invention allows a user to make annotations and additions to a Web document, but does not require modification of the browser, the server, or the original document stored on the server.

In accordance with a purpose of the invention, as embodied and broadly described herein, the invention includes a method for processing documents in an http network environment in a customized fashion using a standard http browser. The method may be performed by a data processing system, performing steps such as: receiving, from a standard http browser, one or more http requests to store custom information associated with a selected network document; storing the associated custom information; receiving, from the standard http browser, one or more requests for the selected network document; redirecting at least a portion of the http requests for the selected network document to a network server hosting the selected document; retrieving the selected document; retrieving the custom information; and transmitting the selected network document and a custom response derived using the custom information to the standard http browser, to thereby cause the browser to display the network document in association with the information contained in the custom response.

In further accordance with a purpose of this invention, as embodied and broadly described herein, the invention includes the storage of various types of information by the redirector. For example, the redirector may index the text of all documents requested by the user via the redirector. The user can then later search for any word in the previously accessed documents through the use of a standard search engine that accesses custom indexing information stored by the redirector. The user can then request the previously viewed document that the search engine determines contains the search terms.

In another example, a plurality of redirectors store custom information, such as annotations, in hierarchical form. A low level redirector in the hierarchy may store custom information (e.g., annotations) belonging to an individual in a department of a company. A higher level redirector in the hierarchy may store custom information belonging to everyone in the department. Thus, for example, both "individual" redirectors and "group" redirectors may store custom information for a given Web document. Requests from a user to view the Web document will be routed through these several levels of redirectors allowing the user to view both his own annotations and departmental annotations. If the custom information reflects annotations made by a user, the user may choose to see only his own annotations, only the group annotations, both, or neither.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

A preferred embodiment of the present invention allows a user of a Web browser to store and access "custom information" for a Web document. In one embodiment, the custom information includes "annotation" information, such as notes, comments, etc. input by the user. Custom information can also include, for example, search tables for Web documents that have been viewed by the user.

The stored custom information is not a permanent part of the Web document. The original HTML for the Web document is not modified by the present invention and the present invention can operate with any HTML server. Similarly, the present invention does not require that any modifications be made to a HTML browser and the present invention can operate with any browser.

1. Displaying an Annotated Document

Figure 1:
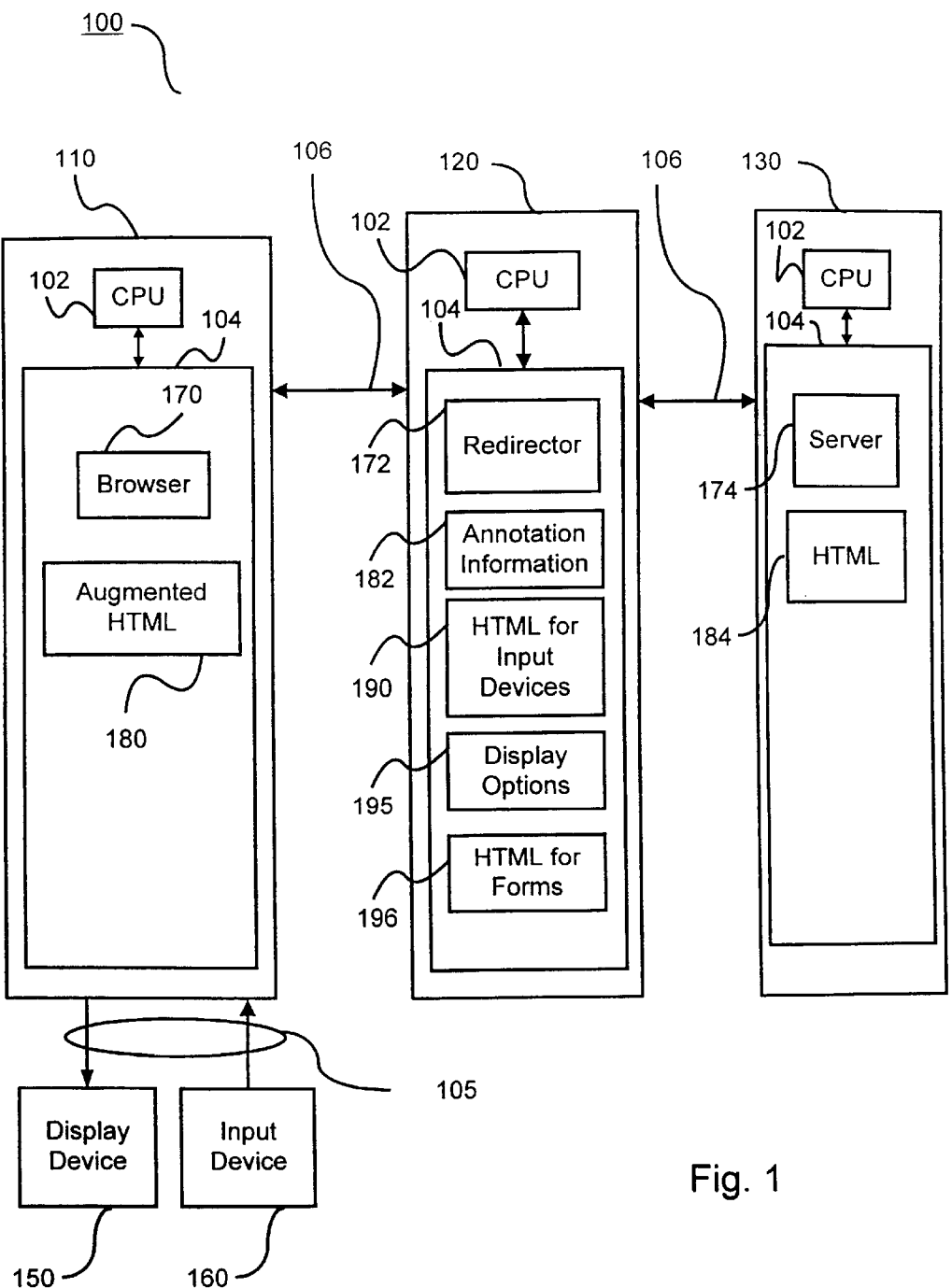
FIG. 1 is a block diagram of a computer system in accordance with the present invention.

FIG. 1 is a block diagram of a computer system 100 in accordance with the present invention. Computer system 100 includes a first computer 110, a second computer 120, and a third computer 130. The first, second, and third computers are connected by network connections 106, such as internet connections or the connections of a LAN.

Each computer 110, 120, and 130 includes a CPU 102 and a memory 104. First computer 110 also includes input/output lines 105, connected to a display device 150 and an input device 160. Display device 150 is, e.g., a display terminal, and input device is, e.g., a keyboard or a mouse. It will be understood by persons of ordinary skill in the art that computer system 100 can also include numerous elements not shown in FIG. 1 for the sake of clarity, such as disk drives, additional keyboards, additional output lines, additional display devices, additional network connections, additional memory, additional CPUs, etc.

Memory 104 of first computer 110 includes a computer program called a "browser" 170 and data 180 representing augmented HTML, as discussed below. Memory 104 of second computer 120 includes a computer program called a "redirector" 172, data 182 representing annotation information (as discussed below), data 190 representing HTML for buttons (see FIGS. 4 and 7–9), data 195 representing the values of display options entered by the user (or default values) and date 196 representing HTML for various forms used in the present invention. Memory 104 of third computer 130 includes a computer program called a "server" 174 and data 184 representing unaugmented HTML for a Web document, as discussed below. A person of ordinary skill in the art will understand that memories 104 may also contain additional information, such as application programs, network communication programs (e.g., the TCP/IP protocol suite), operating systems, data, etc., which are not shown in the figure for the sake of clarity. A preferred embodiment of the present invention executes under the "IRIX" operating system, available from Silicon Graphics, Incorporated of Mountain View, Calif.

It will be understood that, although three separate computers are shown, the present invention can also be implemented so that the browser, redirector, and server are all running on the same machine, or on some combination of multiple machines.

In the described embodiment, the custom information (e.g., annotations) 182 is stored in memory 104 of second computer/redirector 120. Assuming that the annotation display option is selected, whenever the user, via the browser, asks to view a Web document, the redirector adds HTML corresponding to the annotation information to the HTML for the Web document and sends the "augmented HTML" to the browser to be displayed. The redirector also modifies all URLs occurring within the HTML for the document so that all URLs in the HTML point back to the redirector, as will be explained below.

In the described embodiment, the browser preferably is the "NAVIGATOR," version 1.1, available from Netscape Communications, Inc. The invention is not however, dependent upon the particular brand of browser used. The invention will operate with any HMTL-compatible browser. "NETSCAPE" and "NAVIGATOR" are claimed to be the trademarks of Netscape Communications, Inc.

Figure 2:
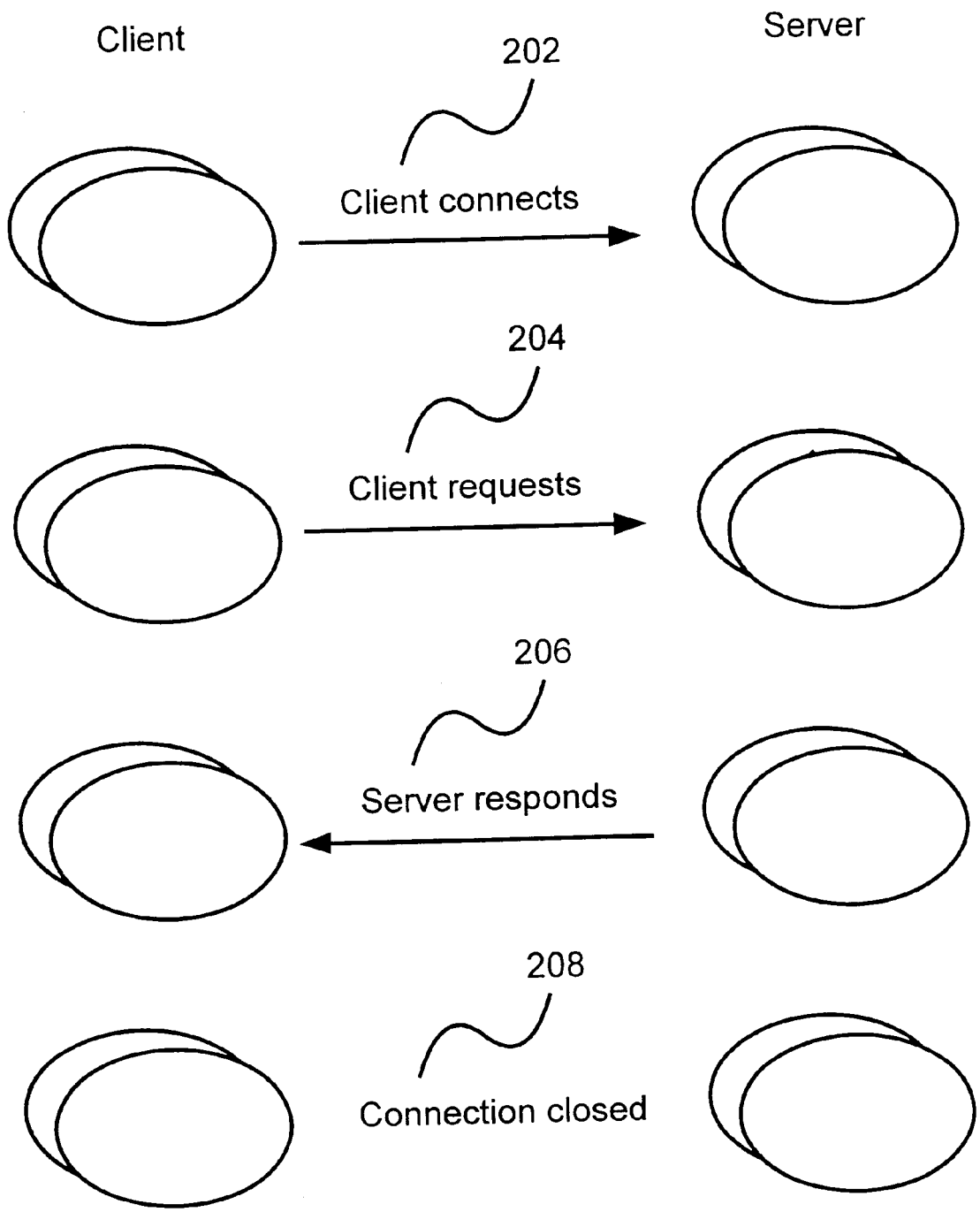
FIG. 2 is a diagram showing a client-server communication interchange under the HTTP protocol.

FIG. 2 is a diagram showing a conventional client-server communication interchange under the HTTP protocol. HTTP is a "stateless" communication protocol, in that it does not keep track of a current "state" between a client and a server. Each time a client wishes to communicate with a server, the client first connects to the server 202 and then sends a request 204. The server sends a response to the request 206, after which both the client and the server close the connection 208. As will be understood by persons of ordinary skill in the art, other communication protocols allow the client and server to negotiate with each other and/or to establish a connection that extends over an exchange of multiple messages. The present invention is not dependent on any particular communication protocol and may be used with any appropriate protocol that allows a redirector to operate as described herein.

Figure 3:
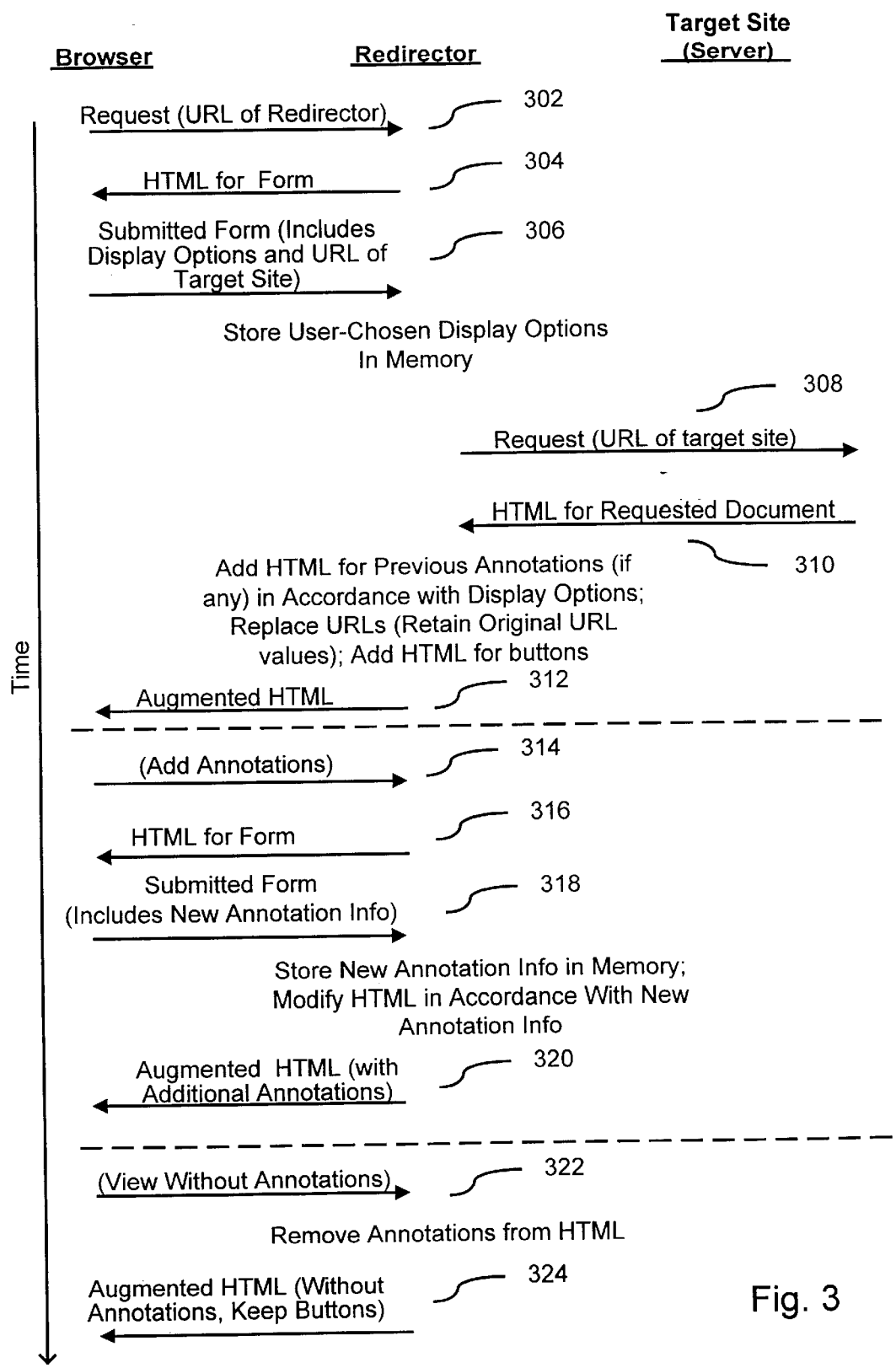
FIG. 3 is a diagram showing exchanges between a browser, a redirector, and a server of FIG. 1.

FIG. 3 is a diagram showing exchanges between browser 170, redirector 172, and server 174 of FIG. 1. Each of these is a computer program stored in a memory 104 and being executed by a corresponding CPU 102. In the described embodiment, each pair of communications between the client and the redirector (and between the redirector and the server) operates as shown in FIG. 2. The opening and closing of connections are not shown in FIG. 3 to enhance the clarity of the explanation.

The steps of FIG. 3 display a document in accordance with the invention and allow the user to store and display custom information for the Web document. Initially, browser 170 sends an HTTP request to redirector 172 (step 302). The request includes the redirector's address (URL) and indicates that the browser wishes to communicate with the redirector located at that URL. Redirector 172, operating as a server for its client browsers, listens on a specified port for browser requests. In the described embodiment, a user initially instructs browser 170 to send the initial URL of the redirector. In an alternate embodiment, the redirector is "transparent" to the user and browser 170 sends the URL of the redirector automatically upon the occurrence of some predetermined event.

For example, in FIG. 1, if redirector 172 is running on a machine 120 called "machine1.company1.com" on a port 8080, the URL of the redirector would be:

http://machine1.company1.com:8080

When redirector 172 receives its own URL, it returns the HTML of a "form" to browser 170 (step 304 in FIG. 3). Forms, which are known to persons of ordinary skill in the art, are a subset of HTML that tells the browser to display a form in accordance with the HTML for the form, to accept user input, and to "submit" the user input back to the sender of the form.

Figure 4:
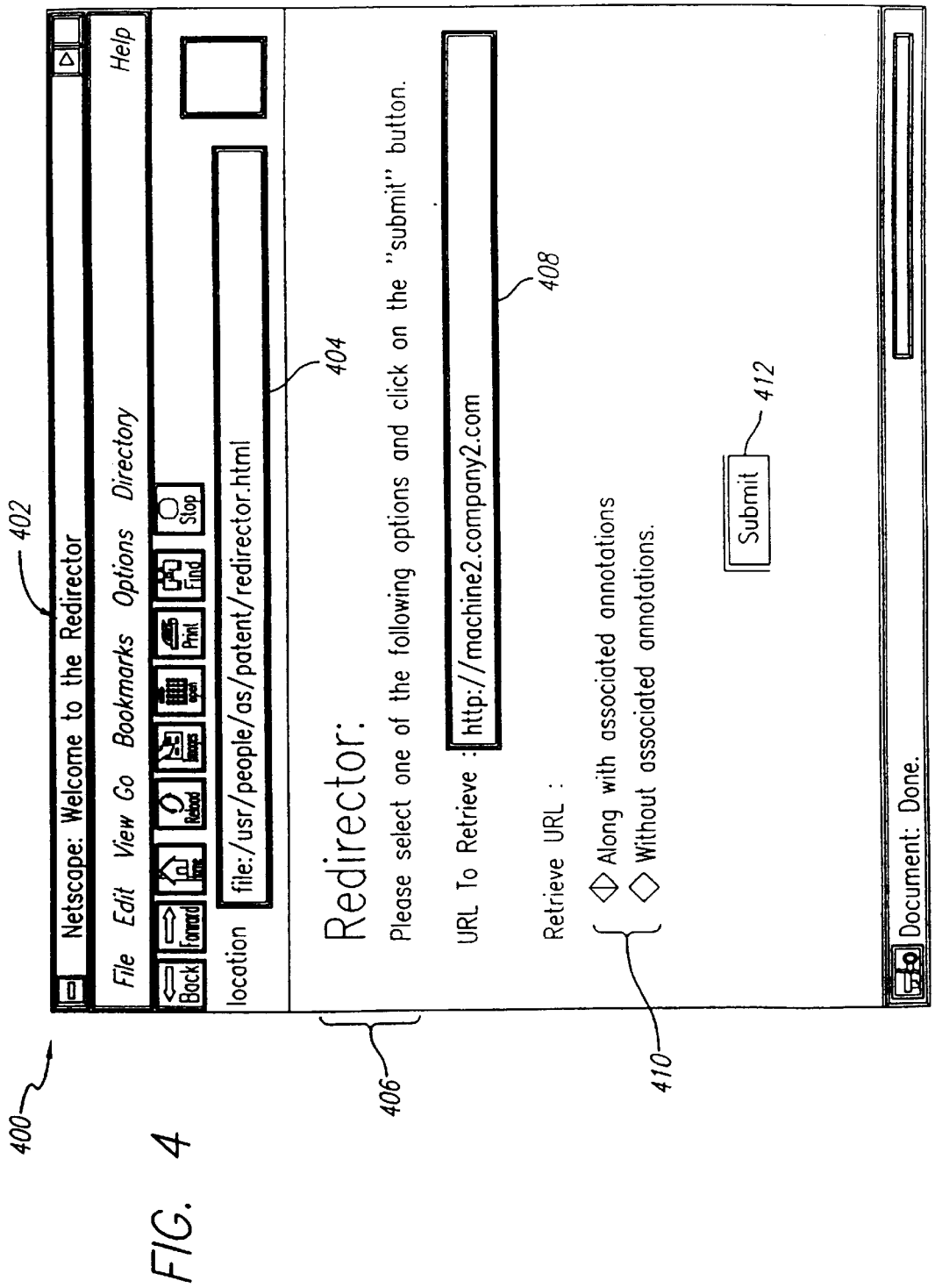
FIG. 4 shows a form displayed on a display screen by the browser.

FIG. 4 shows an example of a display 400 displayed by browser 170 in accordance with HTML for a form received from redirector 172. The form HTML specifies a title 402, a URL 404, a body of the form 406, entry area 408, user-entry area 410, and a "submit" button 412. Each of these portions of display 400 is generated by browser 170 in accordance with the form HTML. The remainder of the display 400 is generated by whatever browser 170 is being used and may vary depending on the manufacturer of browser 170.

Once display 400 is generated by browser 170 in accordance with the form HTML, the user specifies (in area 408) a URL of a document that he wishes to view and/or annotate. The user also specifies (in area 410) whether he wishes to view annotations to the document that he has made previously. This indication is termed a "display option." When the user clicks on submit button 412, the browser sends the information entered by the user (i.e., display options and the URL of the document to view) to the redirector (see step 306).

In the described embodiment, instead of having the redirector send a form to the browser in steps 304 and 306, the user may initially indicate the display options and the URL of the document to view as a part of the initial URL sent to the redirector in step 302. In this case, the URL of step 302 would look like:

http://machine1.company1.com:8080/annot=yes/
machine2.company2.com

In this example, the URL of the redirector is "machine1.company1.com", the port is "8080", the user wishes to view previously made annotations (annot=yes), and the URL of the document that the user wished to view is "machine2.company2.com". If the user specifies display options and the URL of the requested document in the initial URL, the redirector does not send a form and steps 304 and 306 are omitted.

Redirector 172 stores the user-selected display options (in memory 195) and stores the URL of the requested document (not shown). Once redirector 172 receives the URL of the requested document, it sends a request (URL) to server 174 in step 308. Server 174 returns HTML for the requested document to redirector 172 (step 310).

Figure 5:
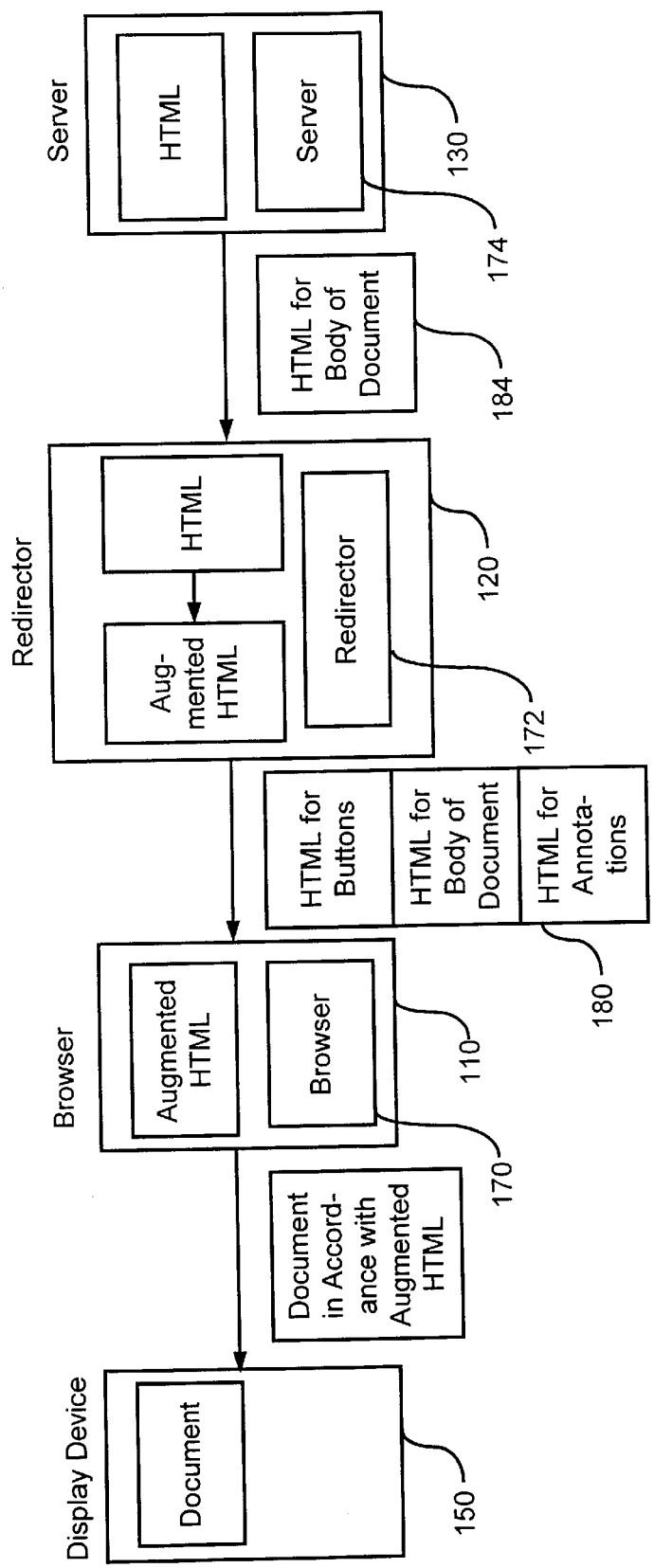
FIG. 5 shows a data path between the server, the redirector, and the browser.

FIG. 5 shows a data path of HTML between server 174, redirector 172, and browser 170. Server 174 sends HTML 184 for the requested document to the redirector 172. Redirector 172 then creates augmented HTML 180 by concatenating its own URL with the URL of the target document (and any other URLs in that document) and by adding additional HTML to display the previous annotations and certain user-input devices, such as buttons. Alternatively, the redirector may simply replace the target documents' URLs with the URL of the redirector and store the replaced URLs so that the documents associated with these URLs can be retrieved upon request of the user. In either event, in step 312, redirector 172 sends augmented HTML 180 to browser 170, which displays a document in accordance with the augmented HTML on display device 150.

As mentioned above, HTML 184 of the requested document may contain URLs that provide links to other documents in the World Wide Web. When redirector 172 receives HTML 184 for the requested document, it first parses the HTML looking for such URLs (e.g., URLs are sometimes identified by their initial string "http://"). Redirector 172 modifies any URLs found in the unaugmented HTML so that, in the augmented HTML, such URLs point back to the redirector, as described below. Redirector 172 also adds additional HTML to the HTML received from server 174. The additional HTML corresponds to previous annotations made by the user (if the "view annotations" option=yes) and to various buttons and user-input devices that will be displayed with the requested document. Thus, augmented HTML 180: (1) contains the URL of the redirector in place of or concatenated with the internal URLs that were in the original document and (2) contains additional HTML so that the browser will display any previously made annotations and will further display certain user-input devices.

Figure 6A:
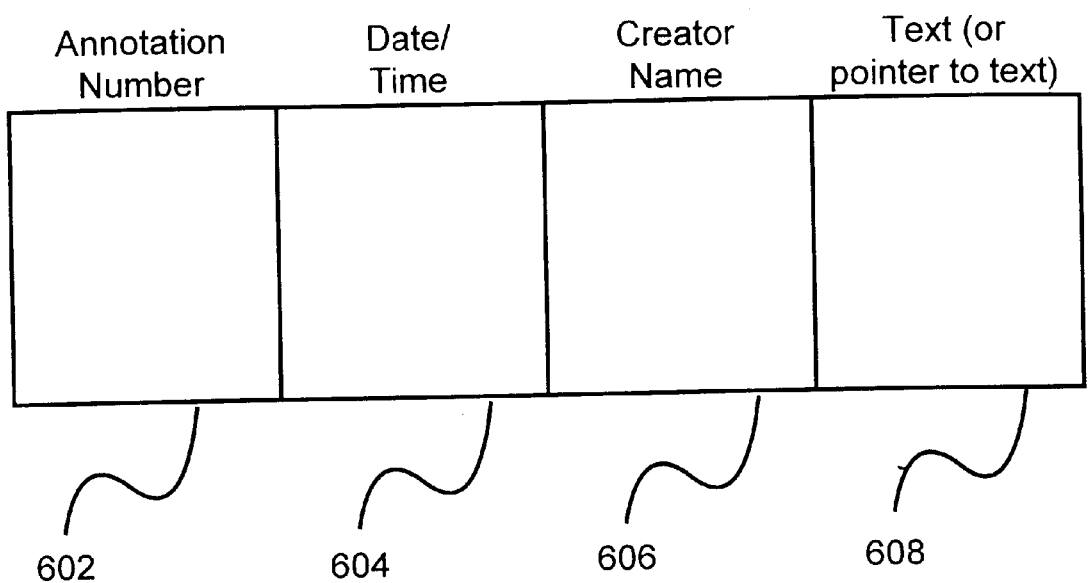
FIG. 6(a) shows a format of a data structure in a memory for the redirector for storing annotation information.
Figure 6B:
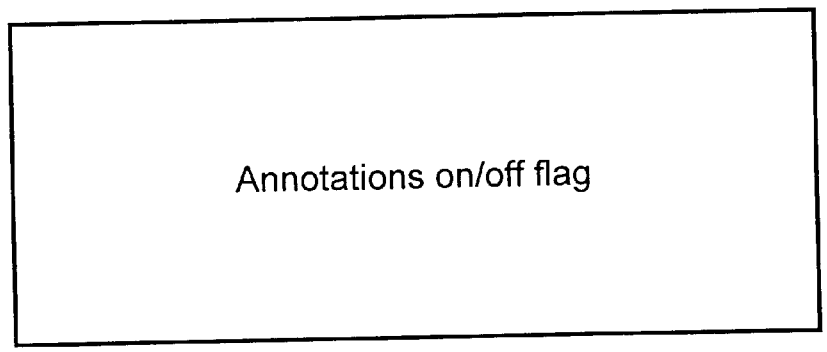
FIG. 6(b) shows a format of a data structure in the memory for the redirector for storing display option information.

FIG. 6(*a*) shows an exemplary format of a data structure in memory 104 of redirector 172 for storing annotation information 182. The data structure preferably includes an annotation number field 602, a date/time field 604, a creator name field 606, and a text field 608. Each of these fields is discussed below in connection with FIG. 7.

FIG. 6(*b*) shows an exemplary format of a data structure in memory 104 of redirector 172 for storing display option values. The data structure preferably includes a flag indicting whether the user wishes to display annotations. (For example, annotations are displayed in area 712 of FIG. 7). This flag is initially set to "true/yes". If the flag is false, redirector 172 will not generate HTML corresponding to area 712. The flag is turned off or on by the user clicking on buttons 720 and 730 of FIG. 7. This user action causes a form to be sent to redirector 172 which sends augmented HTML (with or without annotations) in accordance with the new flag value.

Figure 7:
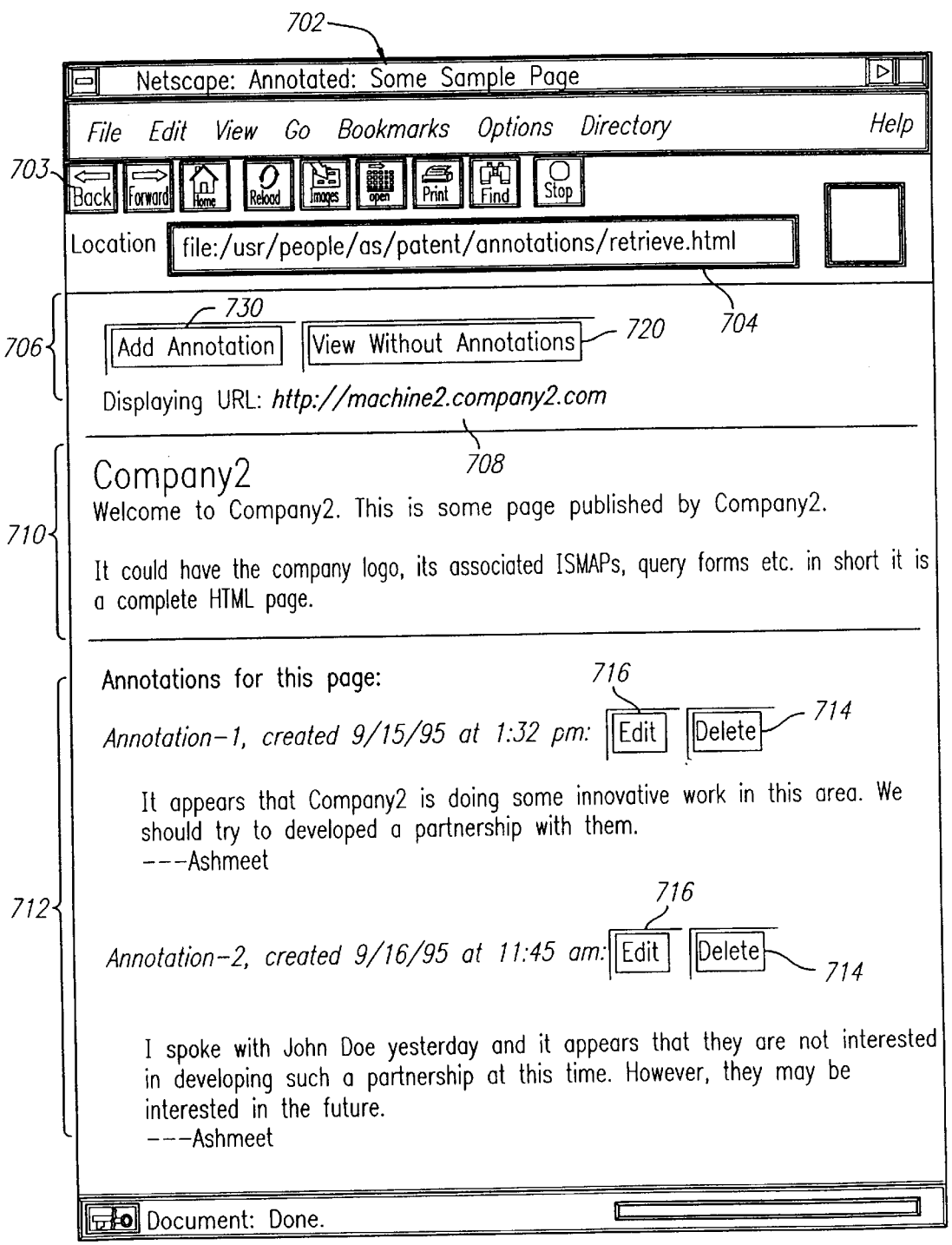
FIG. 7 shows a Web document displayed on the display screen by the browser in accordance with the augmented HTML, including "Edit" and "Delete" buttons for editing and deleting, respectively, the associated annotation.

FIG. 7 shows a document displayed on the display screen by the browser in accordance with the augmented HTML 180. The augmented document includes a title 702, a URL of the redirector 704, a button area 706, a URL of the document being displayed 708, the body of the original document 710 (with any internal URLs modified to point to the redirector), and an annotation display area 712. Augmented HTML 180 describes the general appearance and placement of title 702, URL of the redirector 704, button area 706, URL of the document being displayed 708, the body of the original document 710, and annotation area 712 in accordance with the augmented HTML. Each of these portions of display 700 is generated by browser 170 in accordance with augmented HTML 180. The remainder of the display 700 is generated by whatever browser 170 is being used and may vary depending on the manufacturer of browser 170.

Thus, redirector 172 receives HTML for the body of the original document from the server and adds HTML for title 702, URL of the redirector 704, button area/form 706, URL of the document being displayed 708, and annotation area 712. Browser 170 will thus display, not only the requested Web document, but the buttons and annotations as well since they are described by augmented HTML 180.

Returning to FIG. 3, once the augmented document is displayed by browser 170 after step 312, the user may:

1) Click on a display element corresponding to a URL within the displayed document, to display the document originally corresponding to that URL;
2) Add annotations on the document; or
3) Turn off/on the annotation option.

Each of these user actions is discussed below in turn.

2. Clicking on Display Elements Within a Displayed Document

As discussed above, some documents on, e.g., the World Wide Web, contain URLs within the document. If a user clicks on a display item corresponding to one of these URLs, browser 170 will request and display the document corresponding to the new URL. As will be understood by persons of ordinary skill in the art, these internal URLs can be represented on a displayed document by, for example, a displayed URL, keyword, graphic (known as an "ismap"), or the like.

The following paragraphs explain in more detail how URLs within a document are modified by redirector 172 and the effect of clicking on displayed elements corresponding to these modified URLs. If, for example, HTML 184 for the requested document contains a link to the URL:

http://machine3.company3.com redirector 172 replaces this link within augmented HTML 180 with a link of:

http://machine1.company1.com/annot=yes/ machine3.company3.com

That is, the two URLs are concatenated.

In this example, the HTML for the requested document includes a link to a document stored at the URL "machine3.company3.com". Redirector 172 replaces the original URL by a URL of the redirector "machine1.company1.com", along with an indication of the user-selected option "annot=yes" and an indication of the original URL "machine3.company3.com".

When the requested document is displayed by the browser (see FIG. 7), the display will include a display element corresponding to the modified URL (not shown, but, for example, a keyword or a graphic). If the user clicks on the display element corresponding to the modified URL (that previously pointed directly to machine3.company3.com), the browser accesses the redirector instead of the document pointed to by the original URL link (see steps 302, etc. of FIG. 3). Because the replaced URL includes information about the new document to be viewed and the annotation option value (yes), steps 304 and 306 will be omitted and HTML 184 for new a document will be fetched, augmented, and displayed as described above. In the described embodiment, the annotation option defaults to "yes", which indicates that previous and new annotations will be displayed.

As is known by persons of ordinary skill in the art, when the user presses the "back" button 703, the browser sends a previously sent URL so that the view will "go back" and a previous document will be displayed. Pressing "back" 703 will automatically result in the correct annotation option since it is cached and reloaded by the browser as part of the URL. If no annotation option is specified in the URL, the redirector backs up using an annotation option default of "yes".

3. Adding Annotations to a Document

If the user wishes to add an annotation to the displayed document, he clicks on "Add Annotation" button 730. Since button area 706 is part of an http form, clicking on button 730 causes browser 170 to send an indication to redirector 172 that the user wishes to add an annotation (see step 314 of FIG. 3). In step 316 of FIG. 3, redirector 172 sends an "Add Annotation" form to browser 170.

Figure 8:
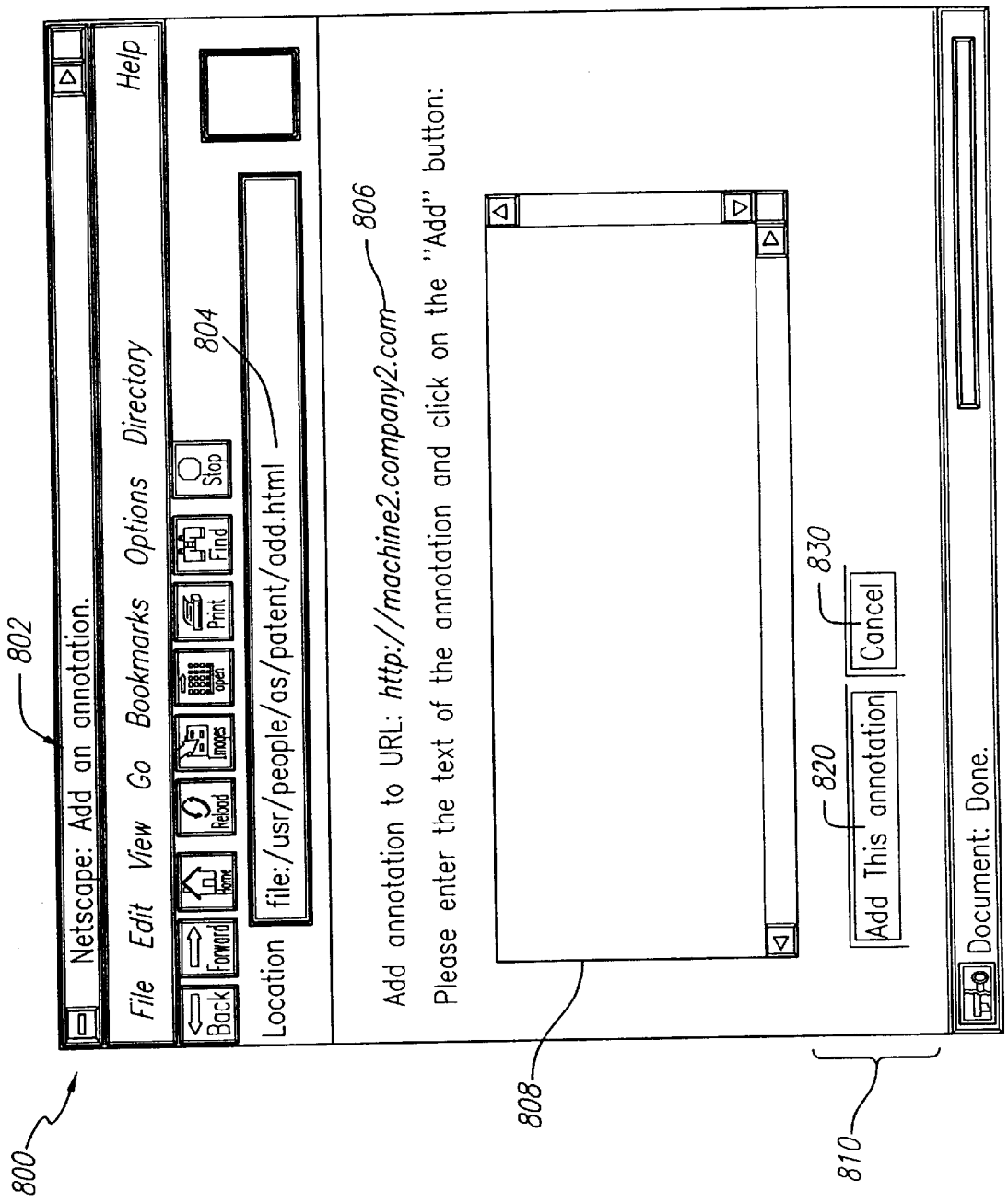
FIG. 8 shows an "add annotation" form displayed on the display screen by the browser.

FIG. 8 shows an example of an "Add Annotation" form 800 displayed on the display screen by the browser. The form includes a title 802, a URL of the redirector 804, a URL of the document being annotated 806, an annotation area 808, and a button area 810. The user enters his annotation into annotation area 808, where it is temporarily saved in a memory of browser 170. If the user clicks on "Add This Annotation" button 820, the browser submits the form contents (i.e., the user's annotation) to redirector 172 (see step 318 of FIG. 3).

If the user clicks on "Cancel" button 830, the browser does not submit a form. When either button 820 or 830 is clicked, the browser closes the window containing form 800.

4. Alternate Preferred Embodiments

An alternate implementation of the present invention also allows the user to delete an annotation by clicking on a "Delete Annotation" button 714 that is part of a display similar to that of FIG. 7. Clicking on this button causes browser 170 to send an indication to redirector 172 that the user wishes to delete the annotation. Upon receipt of the "Delete Annotation" instruction, redirector 172 removes corresponding annotation information of memory 182 and resends new augmented HTML that does not include the deleted annotation.

An alternate implementation of the present invention allows the user to edit an annotation by clicking on an "Edit Annotation" button 716, such as that shown in FIG. 7. Clicking on this button causes browser 170 to send an indication to redirector 172 that the user wishes to edit an annotation. In a manner similar to that of steps 314, 316, of FIG. 3, redirector 172 sends an "Edit Annotation" form to browser 170 and receives the edited annotation from browser 10.

Figure 9:
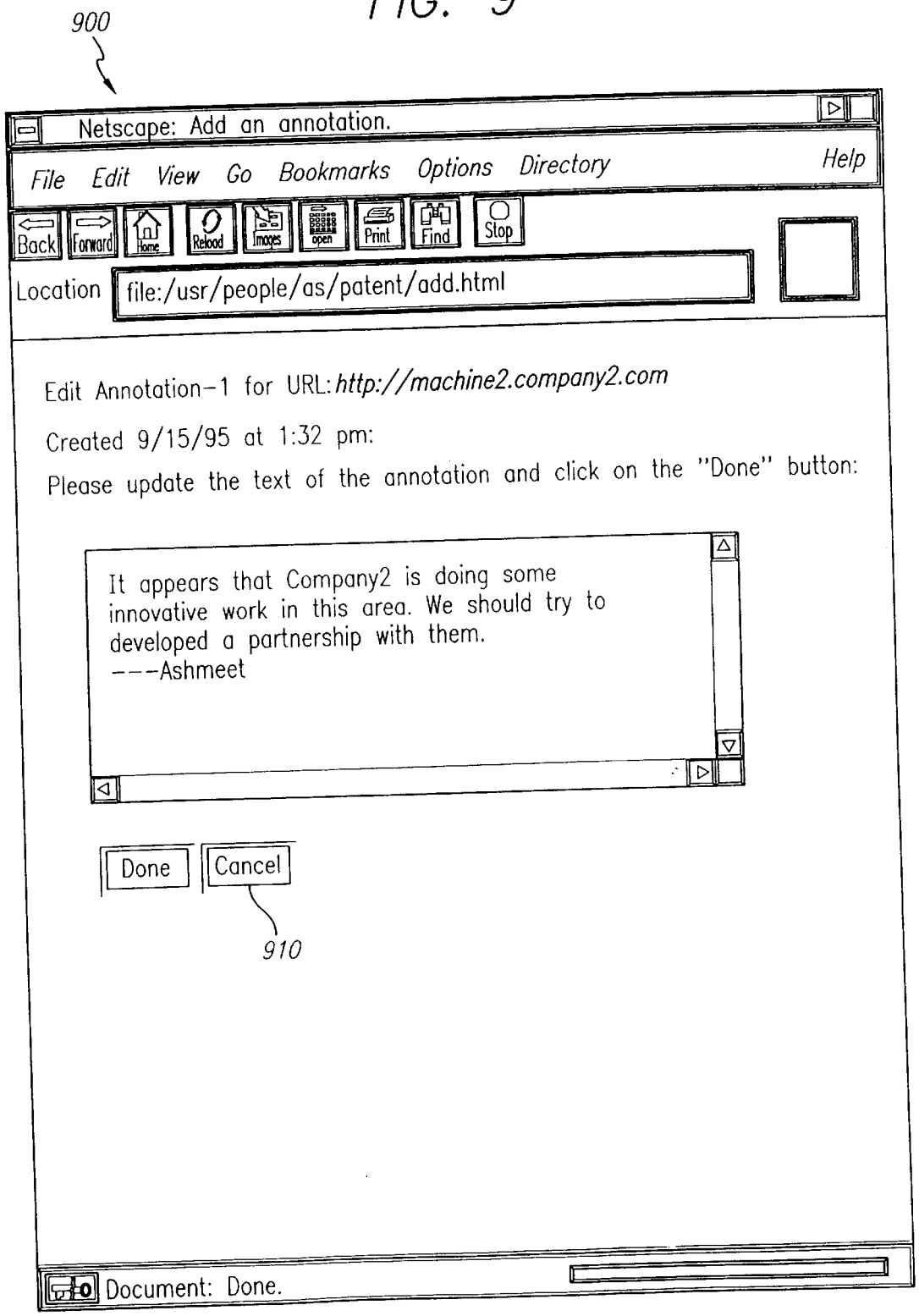
FIG. 9 shows an "edit annotation" form displayed on the display screen by the browser.

FIG. 9 shows an "Edit Annotation" form 900 displayed on the display screen by the browser. Redirector 172 modifies corresponding annotation information 182 and resends new augmented HTML that includes the modified annotation. If the user edits the annotation, but presses "cancel," 910 the browser does not send the edits to redirector 172 and edits are not added to augmented HTML 180.

Figure 10:
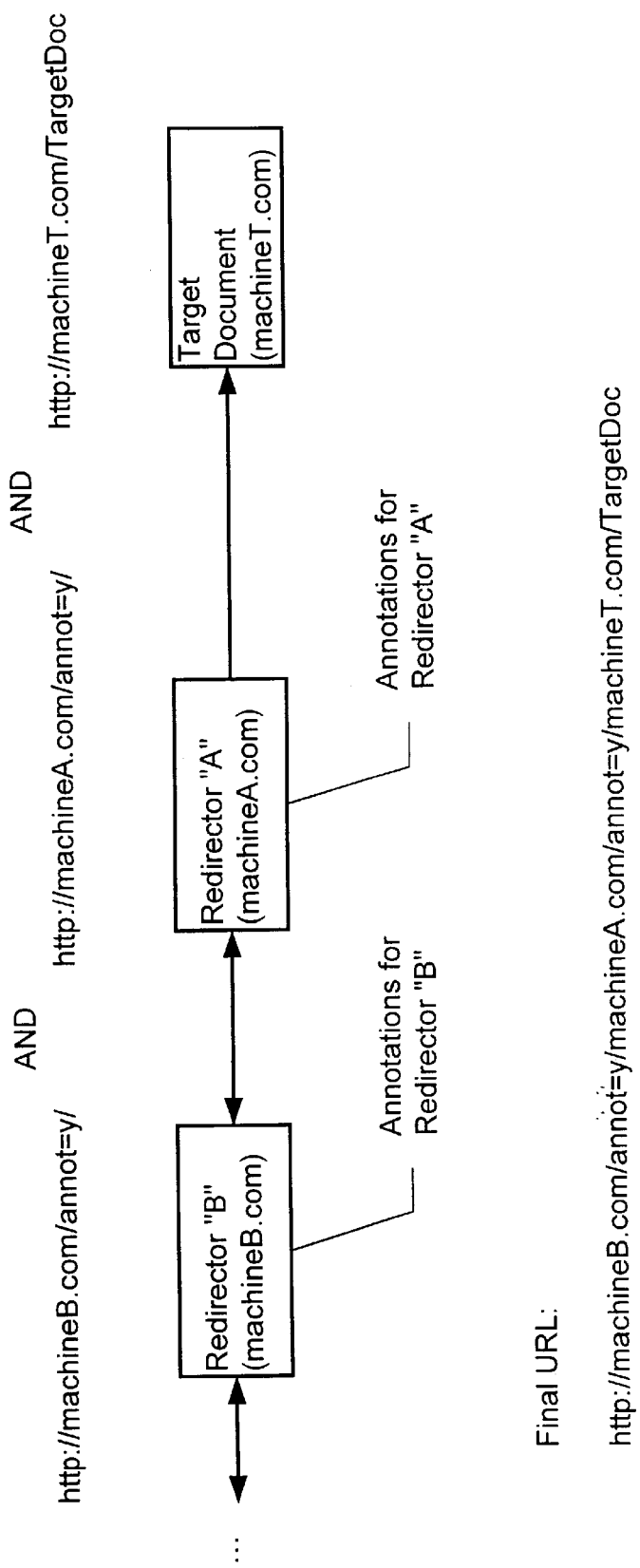
FIG. 10 shows an example of two redirectors chained or "linked" together.

FIG. 10 shows an example of two redirectors chained together. For example, a user with his own redirector B might wish to annotate an annotated document which the user is accessing through a redirector A. In this case, the concatenation of the URL generated by redirector A and redirector B would be the final URL used to access the annotations of the annotated document. Even though machines A, B, and T are shown as separate machines in FIG. 10, one or more of them may, in fact, be the same machine. In this case, the redirectors on the same machine would need to be identified by using a different network "port." For example, if redirector A is on port 8080 of machine B, then the URL of FIG. 10 would be:

http://machineB.com/annot=yes/machineB.com:8080/
annot=yes/machineT.com/TargetDoc Although FIG. 10 shows two redirectors, any number of redirectors can be chained together. Such an arrangement can be used, for example, to implement a hierarchical tree structure of redirectors where users can view various levels of annotations, depending on their security level. For example, redirector B could store annotations made by an individual that are for him alone, and redirector A could store annotations made by a department manager that are to be read by everyone in the department.

In another preferred embodiment, a user is allowed to enter his name or user ID via a display similar to that of FIG. 4. The annotation information includes the name of the person who created the annotations. The user can then decide whether to view his own annotations only, or annotations made by various other persons accessing documents via the redirector. In yet another embodiment, the user has the option of designating some or all of his annotations "private" or "public", thereby blocking or allowing access to their annotations by other users. Such an embodiment is extremely useful when several persons are working on a joint project and wish to share general comments, while keeping other comments private. In such a case, the redirector stores the comment, along with their public/private attributes.

In another preferred embodiment, the user can, at his option, view the names or user IDs of any users that are currently viewing the same document (or that are currently viewing any document through the redirector). The user might also be able to view the names and IDs of any user that has viewed the document or accessed the redirector during a previous predetermined period of time. Of course, a privacy option also may be available in such a circumstance so that a user can shield his name and ID from other users (or from all users but those with a predetermined clearance or security level). Such an embodiment requires that the redirector keep a list of such user IDs (and their privacy attributes) as custom information and provide the user with a form for indicating that he wishes to view such names.

In another alternate embodiment, redirector 172 can perform an indexing and search function in addition to or instead of the annotation function discussed above. For example, redirector 172 can include search software, such as a full-text search engine (e.g., the "FULCRUM" search engine, available from Fulcrum Software, Inc.). In this embodiment, each time HTML 184 is received from server 174, redirector 172 indexes all text in the HTML 184 and stores the resulting search indices in its memory. Search indices constitute the custom information and are retained for a predetermined time, such as a week or a month. Thus, the user can request a form that allows the user to perform a search on any word or combination of words that appeared in a document accessed by the user in the predetermined period of time. Once the search engine receives the user's search request (via a form), it accesses the stored search indices and returns the desired document (or a list of documents containing the search term). Yet another embodiment may perform full-text searches on the HTML for the displayed document and also on the HTML for all documents referenced within the displayed document (even though these documents are not displayed).

Yet another embodiment of the present invention would allow the user to be informed whenever a change occurs in a document viewed by the user within a predetermined period of time. One form of this embodiment makes use of the HTRP "expires flag." An expires flag forms part of an HTML document and indicates when the document may be changed. The redirector may keep track of the expires flags for each document viewed by a user. When an expires flag indicates that a document has expired, and that therefore a new or modified document may now exist at the same URL, the redirector automatically accesses that URL. The redirector then compares the text of the present document at the URL with all or a portion of the expired document stored in its memory. If the document has been altered, the redirector may send a message, e.g. an e-mail message, to the user.

In another variation of this embodiment, the redirector may be programmed to advise the user, e.g., by sending an e-mail message, if any custom information, such as annotations, is added to a particular document by others with access to the redirector.

Figure 11:
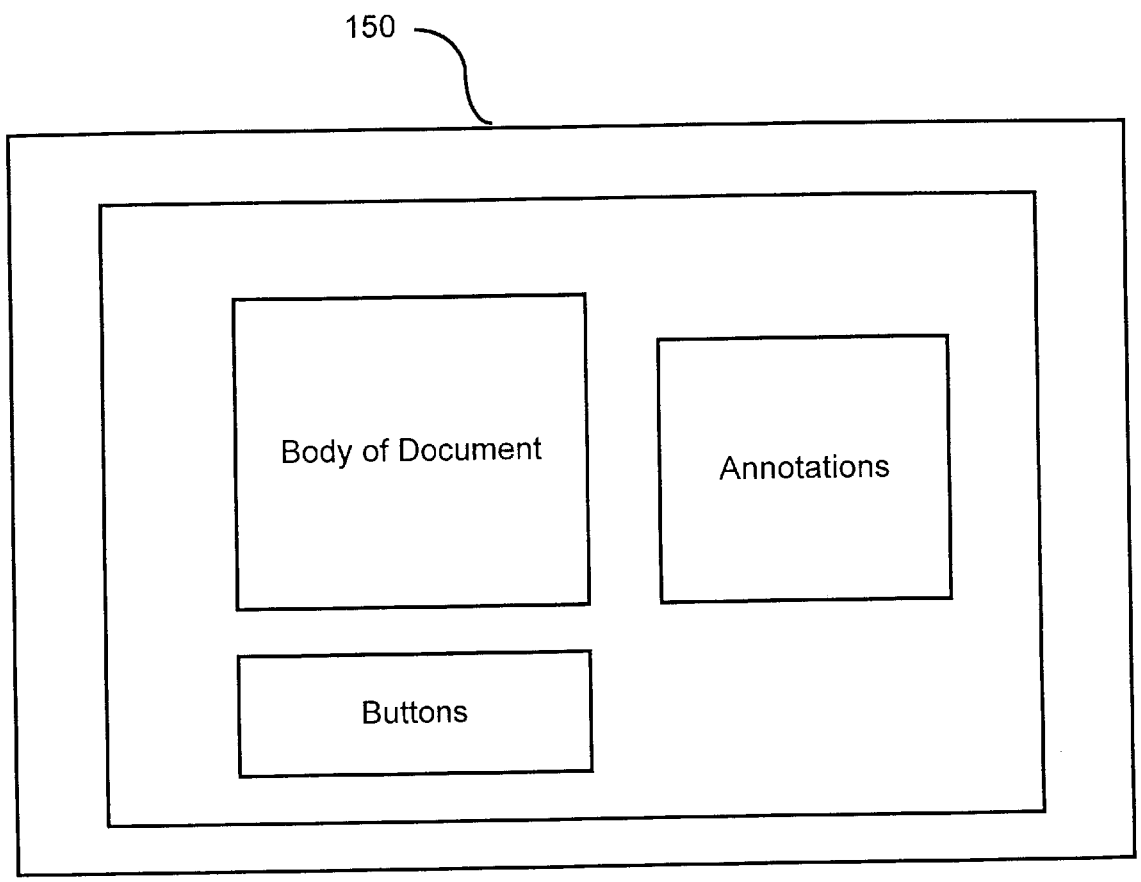
FIG. 11 shows an alternate screen layout for a Web document, wherein the annotations appear to the side of the body of the document rather than below the body of the document, as shown in FIG. 7.

FIG. 11 shows an alternate, easy-to-read screen layout for the form of FIG. 7. Such a screen layout is achievable by using Netscape's "NAVIGATOR" browser as browser 170 and by configuring the augmented HTML to yield the displayed layout.

In summary, the present invention allows a user to enter and store custom information in association with a Web document. The present invention does not require modification of the browser or the server. A preferred embodiment allows a user to add "annotation" information to a document. The annotation information is stored in the memory of a redirector. Whenever the user asks to view a Web document, the redirector adds HTML corresponding to the annotation information to the HTML for the Web document (when the appropriate display option is selected) and sends the "augmented HTML" to the browser to be displayed. The redirector also modifies all URLs occurring within the HTML for the document so that all URLs in the HTML point back to the redirector. Thus, if a user clicks on a display element while viewing the document corresponding to the augmented HTML, the modified URL causes the browser to direct a request for the requested new document through the redirector. Thus, the redirector will also generate augmented HTML for the new document and the new document can also be annotated.

Other embodiments will be apparent to those skilled in the art from consideration of the specification and practice of the invention disclosed herein. It is intended that the specification and examples be considered as exemplary only, with the true scope of the invention being indicated by the following claims and equivalents.

What is claimed is:

1. A web page annotations method, comprising:
   visiting a remote website in a computer system, via a local browser;
   accessing a web page at the remote website;
   annotating the web page via a browser companion in the computer system, wherein the browser companion provides for adding, editing and deleting webpage annotations and annotations display options; and
   storing the web page annotations at a remote location in the computer system.

2. The web page annotations method of claim 1, wherein each of the web page annotations has a title portion and a text portion.

3. The web page annotations method of claim 2, wherein each of the web page annotations further has a date portion indicating the date of annotation.

4. The web page annotations method of claim 2, wherein each of the web page annotations further includes a name portion indicating a user that created the annotation.

5. The web page annotations method of claim 1, wherein each of the web page annotations has a pointer to the text of the web page annotation.

6. The web page annotations method of claim 1, wherein the web page annotations can be turned off and on.

7. The web page annotations method of claim 1, wherein the annotations display options are provided so that the web page may be viewed either with or without the web page annotations.

8. The web page annotations method of claim 1, wherein the web page annotations can be created and viewed as private or public annotations.

9. The web page annotations method of claim 1, wherein the web page annotations can be viewed by a group of users.

10. The web page annotations method of claim 1, wherein the web page can be viewed by a group of users via the browser companion, and wherein any user can view a name and a corresponding identification of users in the group who currently are or previously have been viewing the web page via the browser companion.

11. A computer system, comprising:
    a remote website;
    a web page at the remote website;
    a local browser providing access to the web page;
    means accompanying the browser in the computer system for web page annotations, wherein the means provide for adding, editing and deleting the web page annotations, storing the annotations at a location remote from the local browser and annotations display options.

12. The computer system of claim 11, wherein each of the web page annotations has a title portion and a text portion.

13. The computer system of claim 12, wherein each of the web page annotations further has a date portion indicating the date of annotation.

14. The computer system of claim 12, wherein each of the web page annotations further includes a name portion indicating a user that created the annotation.

15. The computer system of claim 11, wherein each of the web page annotations has a pointer to the text of the web page annotation.

16. The computer system of claim 11, wherein the web page annotations can be turned off and on.

17. The computer system of claim 11, wherein the annotations display options are provided so that the web page may be viewed either with or without the web page annotations.

18. The computer system of claim 11, wherein the web page annotations can be created and viewed as private or public annotations.

19. The computer system of claim 11, wherein the web page annotations can be viewed by a group of users.

20. The computer system of claim 11, wherein the web page can be viewed by a group of users via the web page annotations means, and wherein any user can view a name and a corresponding identification of users in the group who currently are or previously have been viewing the web page via the web page annotations means.

21. A method of annotating using a client computer comprising:
    receiving code and content associated with a web page;
    transmitting annotations associated with the content; and
    receiving augmented code that corresponds at least in part to the transmitted annotations.

22. The method of claim 21, wherein the code comprises a markup language code.

23. The method of claim 21, wherein the annotations include additions, edits and/or deletions.

24. The method of claim 21, further comprising displaying the annotations using a web browser.

25. The method of claim 24, wherein the displaying uses at least in part the augmented code.

26. The method of claim 21, wherein the code includes one or more URLs.

27. The method of claim 21, wherein the augmented code includes one or more URLs.

28. The method of claim 21, wherein the web page has an associated URL.

29. The method of claim 28, wherein the receiving augmented code receives the augmented code from a URL different than the URL associated with the web page.

30. The method of claim 21, further comprising receiving code for a displayable form.

31. The method of claim 30, wherein the form comprises one or more fields for entering annotations.

32. One or more computer-readable media having computer-readable instructions thereon which, when executed by a programmable device, causes the device to receive code and content associated with a web page; to transmit annotations associated with the content; and to receive augmented code that corresponds at least in part to the transmitted annotations.

33. A method for annotating comprising:
    transmitting code and content associated with a web page to a client computer;

receiving from the client computer annotations associated with the content; and transmitting to the client computer augmented code that corresponds at least in part to the received annotations.

34. The method of claim 33, further comprising generating augmented code that corresponds at least in part to the received annotations.

35. The method of claim 33, further comprising transmitting code for a displayable form.

36. The method of claim 35, wherein the form comprises one or more fields for entering annotations.

37. One or more computer-readable media having computer-readable instructions thereon which, when executed by a programmable device, causes the device to transmit code and content associated with a web page to a client computer; to receive from the client computer annotations associated with the content; and to transmit to the client computer augmented code that corresponds at least in part to the received annotations.

* * * * *

UNITED STATES PATENT AND TRADEMARK OFFICE
CERTIFICATE OF CORRECTION

PATENT NO. : 6,571,295 B1
DATED : May 27, 2003
INVENTOR(S) : Sidana

It is certified that error appears in the above-identified patent and that said Letters Patent is hereby corrected as shown below:

<u>Column 10,</u>
Line 37, replace "HTRP" with -- HTTP --.

Signed and Sealed this

Thirtieth Day of September, 2003

JAMES E. ROGAN
*Director of the United States Patent and Trademark Office*